United States Patent
Yi et al.

(10) Patent No.: US 10,602,495 B2
(45) Date of Patent: Mar. 24, 2020

(54) METHOD FOR TRANSMITTING DATA IN A COMMUNICATION SYSTEM AND DEVICE THEREFOR

(71) Applicant: LG Electronics Inc., Seoul (KR)

(72) Inventors: Seungjune Yi, Seoul (KR); Sunyoung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/641,487

(22) Filed: Jul. 5, 2017

(65) Prior Publication Data

US 2018/0007669 A1    Jan. 4, 2018

Related U.S. Application Data

(60) Provisional application No. 62/358,147, filed on Jul. 4, 2016.

(51) Int. Cl.
*H04W 72/04*     (2009.01)
*H04W 72/14*     (2009.01)
(Continued)

(52) U.S. Cl.
CPC ........... *H04W 72/042* (2013.01); *H04L 5/001* (2013.01); *H04L 5/003* (2013.01); *H04W 72/121* (2013.01);
(Continued)

(58) Field of Classification Search
CPC ............. H04W 24/10; H04W 28/0278; H04W 72/0413; H04W 72/042; H04W 72/1284;
(Continued)

(56) References Cited

U.S. PATENT DOCUMENTS 7,751,444 B2 * 7/2010 Chun ............... H04W 8/26
370/474
8,582,514 B2 * 11/2013 Moberg ............ H04W 72/1284
370/329
(Continued)

FOREIGN PATENT DOCUMENTS

CN       105325042 A * 2/2016 ............ H04W 72/04
EP        2244514 A1 * 10/2010 ........... H04L 5/0007
(Continued)

OTHER PUBLICATIONS

Intel Corporation, Necessary modifications to existing Logical Channel Prioritization mechanism, Aug. 26, 2016, 3GPP, 3GPP TSG RAN WG1 Meeting #86, Tdoc: R1-166508, Retrieved from the Internet <URL:https://www.3gpp.org/ftp/tsg_ran/WG1_RL1/TSGR1_86/Docs/R1-166508.zip> [retrieved on Oct. 16, 2019] (Year: 2016).*

(Continued)

*Primary Examiner* — Eric Nowlin
(74) *Attorney, Agent, or Firm* — Dentons US LLP

(57) ABSTRACT

The present invention relates to a wireless communication system. More specifically, the present invention relates to a method and a device for transmitting, by a user equipment (UE), data in a wireless communication system, the method comprising: receiving a first uplink grant for a logical channel group (LCG) and a first LCG indicator of the LCG; generating a Medium Access Control Protocol Data Unit (MAC PDU) containing a data of only the LCG indicated by the first LCG indicator; and transmitting the MAC PDU using the first uplink grant.

4 Claims, 8 Drawing Sheets

(51) Int. Cl.
   *H04W 72/12* (2009.01)
   *H04L 5/00* (2006.01)
   *H04W 88/02* (2009.01)

(52) U.S. Cl.
   CPC ............ *H04W 72/14* (2013.01); *H04L 5/0048* (2013.01); *H04L 5/0053* (2013.01); *H04W 88/02* (2013.01)

(58) Field of Classification Search
   CPC . H04W 72/14; H04W 74/0833; H04W 76/14; H04L 5/001; H04L 5/0053; H04L 47/30
   See application file for complete search history.

(56) References Cited

U.S. PATENT DOCUMENTS

| | | | | |
|---|---|---|---|---|
| 8,861,458 | B2 * | 10/2014 | Dai | H04W 72/1289 370/329 |
| 9,462,602 | B2 * | 10/2016 | Sun | H04W 72/10 |
| 10,027,401 | B2 * | 7/2018 | Speight | H04B 7/15528 |
| 2010/0098011 | A1 * | 4/2010 | Pelletier | H04W 72/1242 370/329 |
| 2011/0038334 | A1 * | 2/2011 | Huang | H04W 72/04 370/329 |
| 2012/0076103 | A1 * | 3/2012 | Dai | H04W 72/1289 370/329 |
| 2012/0099452 | A1 * | 4/2012 | Dai | H04W 72/1284 370/252 |
| 2013/0044623 | A1 * | 2/2013 | Speight | H04B 7/15528 370/252 |
| 2014/0003276 | A1 * | 1/2014 | Zhou | H04W 24/08 370/252 |
| 2015/0173099 | A1 * | 6/2015 | Sun | H04W 72/10 370/336 |
| 2017/0048745 | A1 * | 2/2017 | Yi | H04W 28/0278 |
| 2017/0079065 | A1 * | 3/2017 | Lyu | H04W 72/04 |
| 2017/0118766 | A1 * | 4/2017 | Baek | H04W 72/1268 |
| 2017/0245292 | A1 * | 8/2017 | Agiwal | H04W 28/02 |
| 2017/0257876 | A1 * | 9/2017 | Loehr | H04L 5/0044 |
| 2018/0054755 | A1 * | 2/2018 | Lee | H04W 72/1284 |

FOREIGN PATENT DOCUMENTS

| | | | | |
|---|---|---|---|---|
| EP | 2862402 | A1 * | 4/2015 | ............ H04W 72/10 |
| EP | 3051736 | A1 * | 8/2016 | ............ H04L 5/0044 |
| EP | 3139681 | A1 * | 3/2017 | ............ H04W 72/04 |
| EP | 3139681 | A4 * | 5/2017 | ............ H04W 72/04 |
| KR | 20150109098 | A  * | 10/2015 | |
| WO | WO-2009116939 | A2 * | 9/2009 | ........ H04W 72/1284 |
| WO | WO-2013186594 | A1 * | 12/2013 | ............ H04W 72/10 |
| WO | WO-2015180175 | A1 * | 12/2015 | ............ H04W 72/04 |
| WO | WO-2018169277 | A1 * | 9/2018 | |
| WO | WO-2019063879 | A1 * | 4/2019 | ............ H04W 72/14 |

OTHER PUBLICATIONS

Huawei et al., Discussion on sidelink logical channel prioritization, Apr. 15, 2016, 3GPP, 3GPP TSG-RAN WG2 Meeting #93bis, Tdoc: R2-162170, Retrieved from the Internet <URL:https://www.3gpp.org/ftp/tsg_ran/WG2_RL2/TSGR2_93bis/Docs/R2-162170.zip> [retrieved on Oct. 16, 2019] (Year: 2016).*

Huawei et al., Corrections for sidelink logical channel priorization, Apr. 15, 2016, 3GPP, 3GPP TSG-RAN WG2 Meeting #93bis, Tdoc: R2-162171, Retrieved from the Internet <URL:https://www.3gpp.org/ftp/tsg_ran/WG2_RL2/TSGR2_93bis/Docs/R2-162171.zip> [retrieved on Oct. 16, 2019] (Year: 2016).*

* cited by examiner

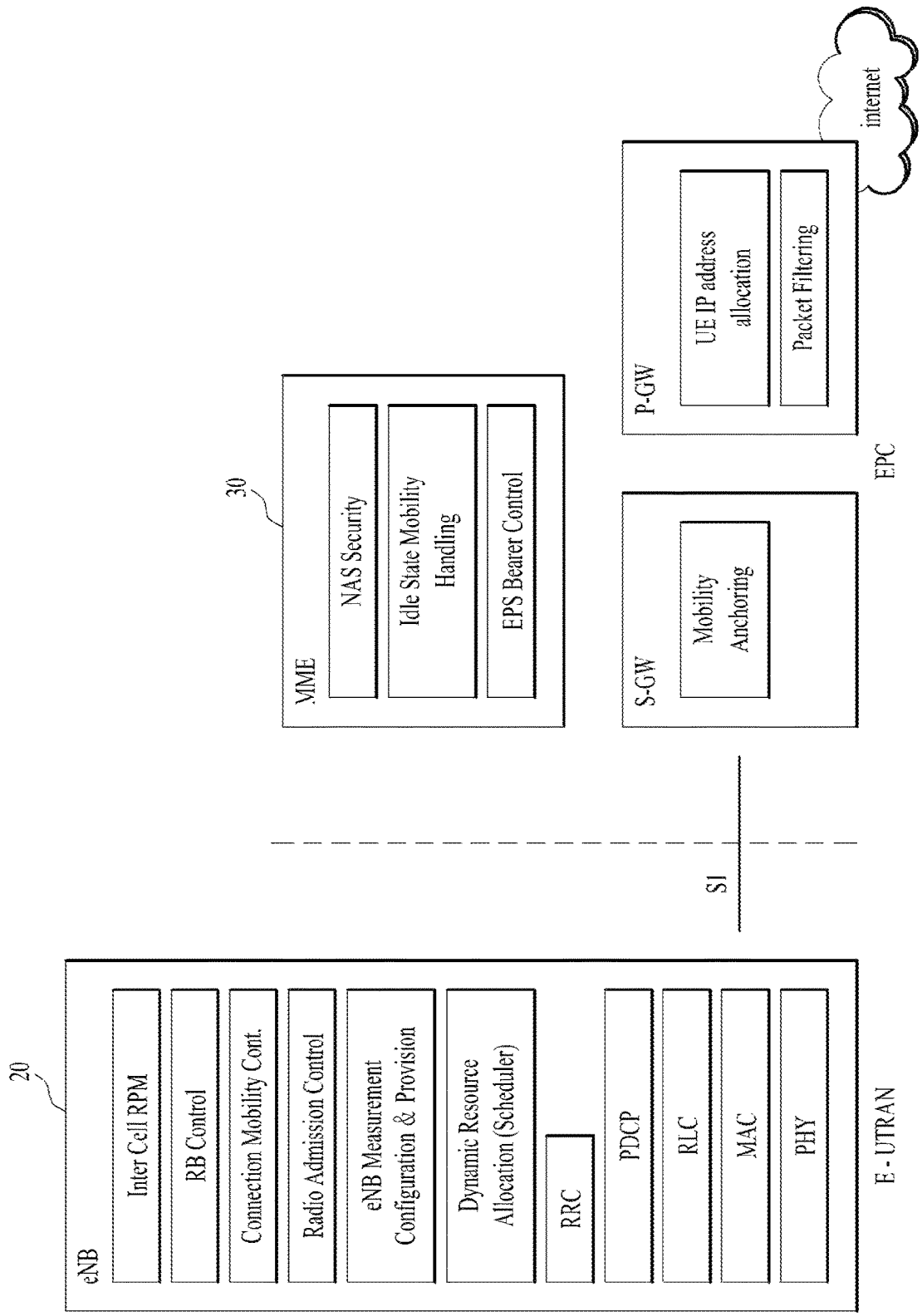

Control-Plane Protocol Stack

User-Plane Protocol Stack

METHOD FOR TRANSMITTING DATA IN A COMMUNICATION SYSTEM AND DEVICE THEREFOR

This application claims the benefit of the U.S. Patent Application No. 62/358,147 filed on Jul. 4, 2016, which is hereby incorporated by reference as if fully set forth herein.

BACKGROUND OF THE INVENTION

Field of the Invention

The present invention relates to a wireless communication system and, more particularly, to a method for transmitting data in a communication system and a device therefor.

Discussion of the Related Art

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

SUMMARY OF THE INVENTION

The object of the present invention can be achieved by providing a method for transmitting, by a user equipment (UE), data in a wireless communication system, the method comprising: receiving a first uplink grant for a logical channel group (LCG) and a first LCG indicator of the LCG; generating a Medium Access Control Protocol Data Unit (MAC PDU) containing a data of only the LCG indicated by the first LCG indicator; and transmitting the MAC PDU using the first uplink grant.

In another aspect of the present invention provided herein is an UE operating in wireless communication system, the UE comprising: a radio frequency (RF) module configured to transmit/receive signals to/from a network; and a processor configured to process the signals, wherein the processor is configured to: control the RF module to receive a first uplink grant for a logical channel group (LCG) and a first LCG indicator of the LCG, generate a Medium Access Control Protocol Data Unit (MAC PDU) containing a data of only the LCG indicated by the first LCG indicator, and control the RF module to transmit the MAC PDU using the first uplink grant.

Preferably, the first uplink grant and the first LCG indicator are received through a Downlink Control Information (DCI) included in a Physical Downlink Control Channel (PDCCH).

Preferably, the DCI further includes a second uplink grant for another LCG and a second LCG indicator of the another LCG.

Preferably, the first uplink grant and the first LCG indicator are received through a downlink MAC PDU included in a Physical Downlink Shared Channel (PDSCH).

The method further comprising receiving a Downlink Control Information (DCI) indicating the PDSCH through a Physical Downlink Control Channel (PDCCH).

Preferably, the first uplink grant and the first LCG indicator are included in the downlink MAC PDU as a MAC control element (CE).

Preferably, the MAC CE further includes a second uplink grant for another LCG and a second LCG indicator of the another LCG.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 2 is a block diagram illustrating network structure of an evolved universal mobile telecommunication system (E-UMTS), and FIG. 2B is a block diagram depicting architecture of a typical E-UTRAN and a typical EPC;

DETAILED DESCRIPTION OF THE INVENTION

Figure 1:
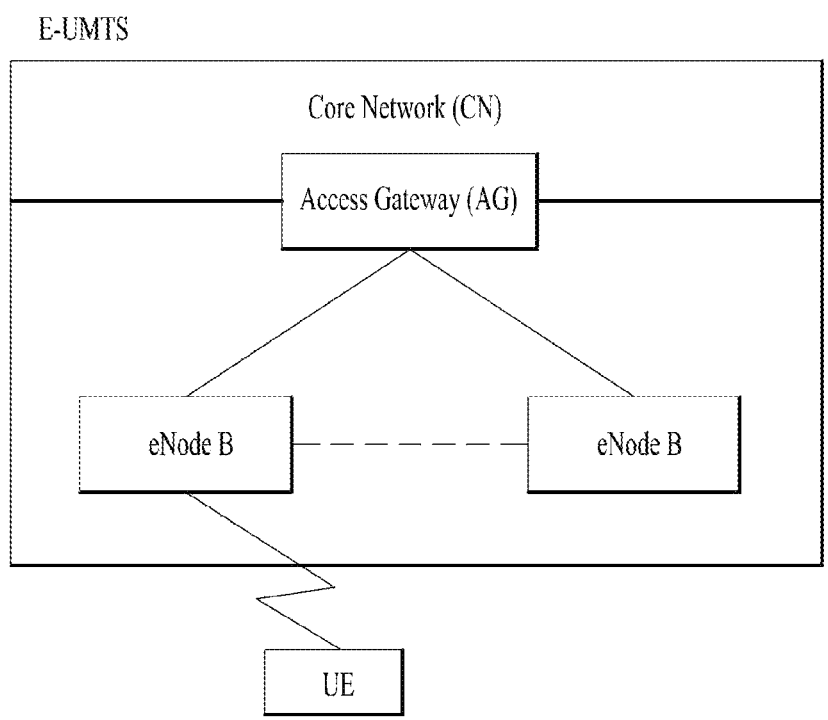
FIG. 1 is a diagram showing a network structure of an Evolved Universal Mobile Telecommunications System (E-UMTS) as an example of a wireless communication system.

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3A:
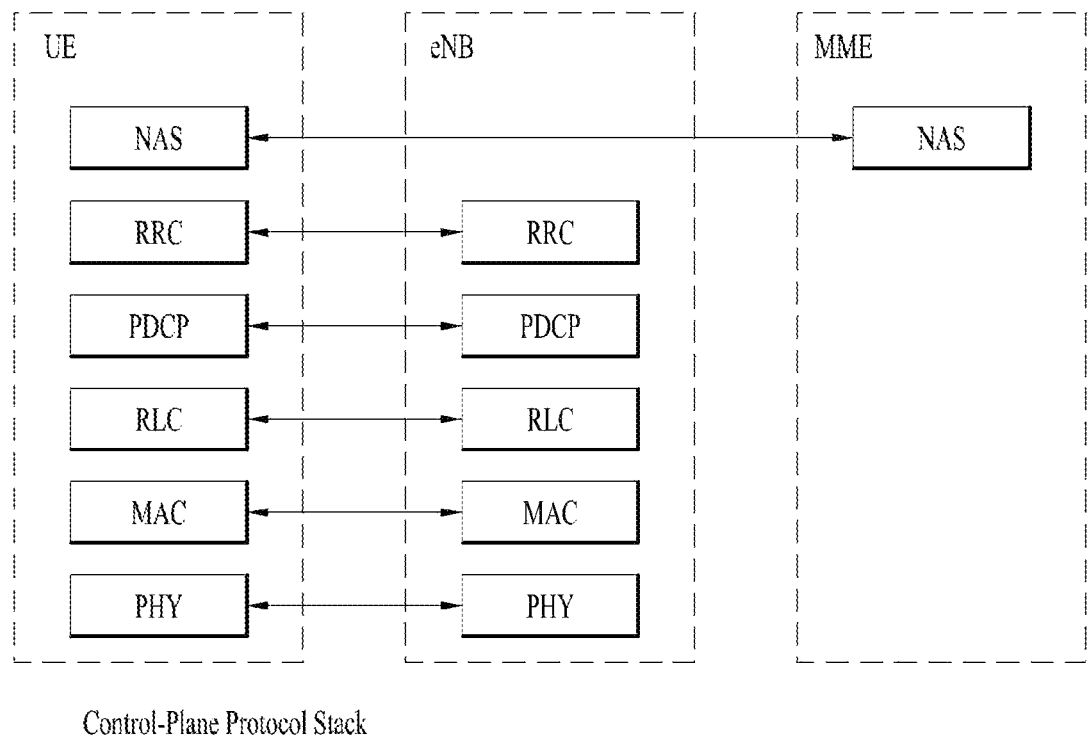
FIGS. 3a and 3b are diagrams showing a control plane and a user plane of a radio interface protocol between a UE and an E-UTRAN based on a 3rd generation partnership project (3GPP) radio access network standard.
Figure 3B:
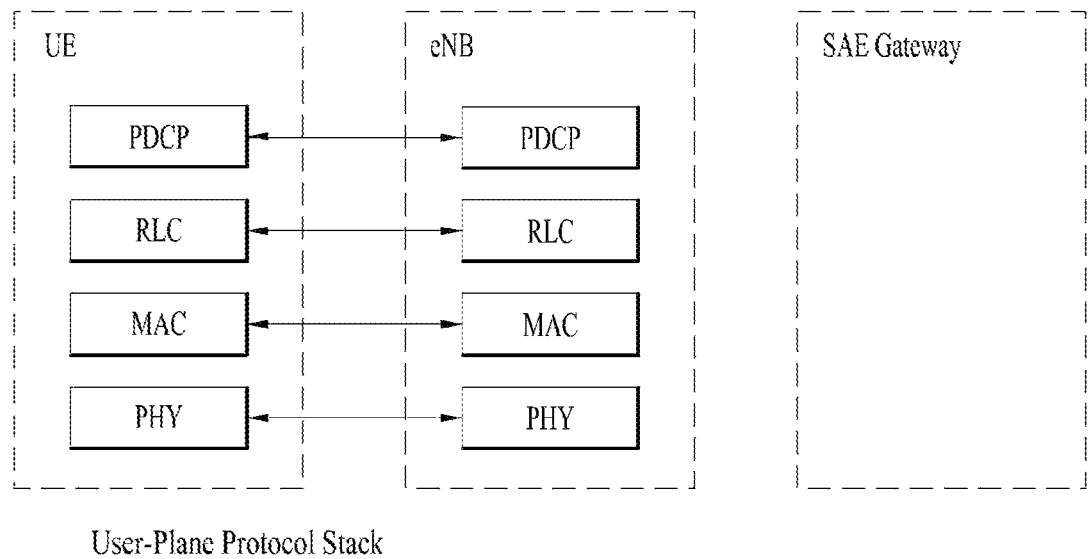

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
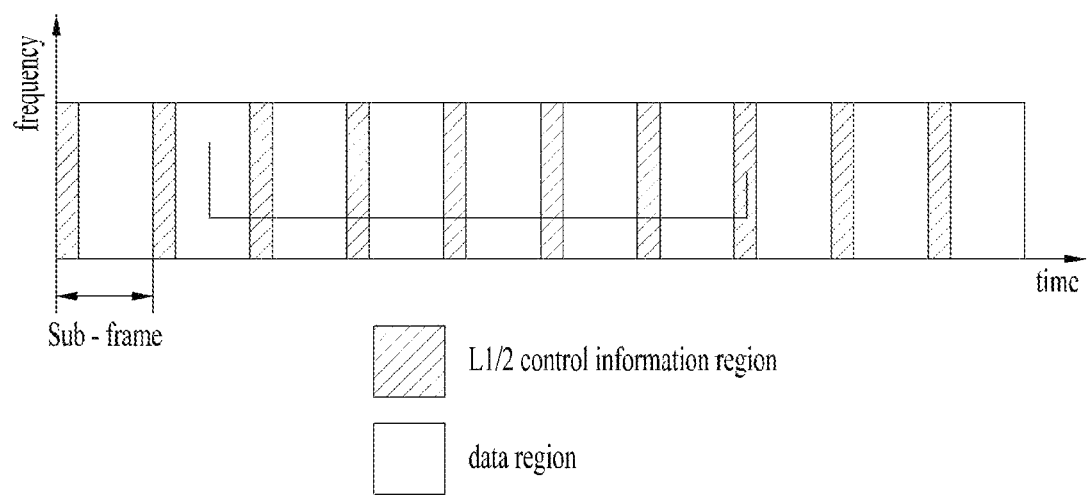
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
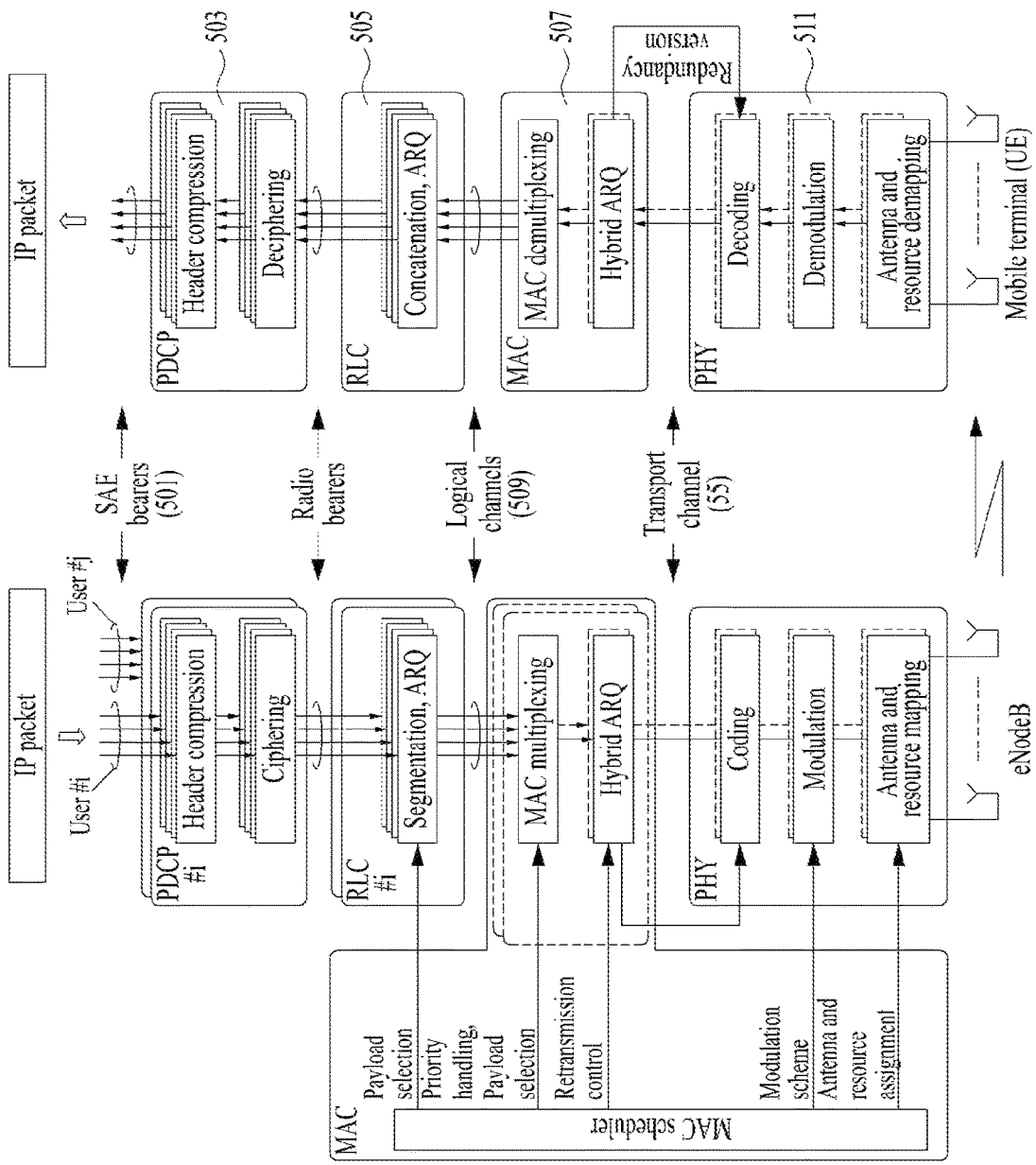
FIG. 5 is a diagram for a general overview of the LTE protocol architecture for the downlink.

FIG. 5 is a diagram for a general overview of the LTE protocol architecture for the downlink.

A general overview of the LTE protocol architecture for the downlink is illustrated in FIG. 5. Furthermore, the LTE protocol structure related to uplink transmissions is similar to the downlink structure in FIG. 5, although there are differences with respect to transport format selection and multi-antenna transmission.

Data to be transmitted in the downlink enters in the form of IP packets on one of the SAE bearers (501). Prior to transmission over the radio interface, incoming IP packets are passed through multiple protocol entities, summarized below and described in more detail in the following sections:

Packet Data Convergence Protocol (PDCP, 503) performs IP header compression to reduce the number of bits necessary to transmit over the radio interface. The header-compression mechanism is based on ROHC, a standardized header-compression algorithm used in WCDMA as well as several other mobile-communication standards. PDCP (503) is also responsible for ciphering and integrity protection of the transmitted data. At the receiver side, the PDCP protocol performs the corresponding deciphering and decompression operations. There is one PDCP entity per radio bearer configured for a mobile terminal.

Radio Link Control (RLC, 505) is responsible for segmentation/concatenation, retransmission handling, and in-sequence delivery to higher layers. Unlike WCDMA, the RLC protocol is located in the eNodeB since there is only a single type of node in the LTE radio-access-network architecture. The RLC (505) offers services to the PDCP (503) in the form of radio bearers. There is one RLC entity per radio bearer configured for a terminal.

There is one RLC entity per logical channel configured for a terminal, where each RLC entity is responsible for: i) segmentation, concatenation, and reassembly of RLC SDUs; ii) RLC retransmission; and iii) in-sequence delivery and duplicate detection for the corresponding logical channel.

Other noteworthy features of the RLC are: (1) the handling of varying PDU sizes; and (2) the possibility for close interaction between the hybrid-ARQ and RLC protocols. Finally, the fact that there is one RLC entity per logical channel and one hybrid-ARQ entity per component carrier implies that one RLC entity may interact with multiple hybrid-ARQ entities in the case of carrier aggregation.

The purpose of the segmentation and concatenation mechanism is to generate RLC PDUs of appropriate size from the incoming RLC SDUs. One possibility would be to define a fixed PDU size, a size that would result in a compromise. If the size were too large, it would not be possible to support the lowest data rates. Also, excessive padding would be required in some scenarios. A single small PDU size, however, would result in a high overhead from the header included with each PDU. To avoid these drawbacks, which is especially important given the very large dynamic range of data rates supported by LTE, the RLC PDU size varies dynamically.

In process of segmentation and concatenation of RLC SDUs into RLC PDUs, a header includes, among other fields, a sequence number, which is used by the reordering and retransmission mechanisms. The reassembly function at the receiver side performs the reverse operation to reassemble the SDUs from the received PDUs.

Medium Access Control (MAC, 507) handles hybrid-ARQ retransmissions and uplink and downlink scheduling. The scheduling functionality is located in the eNodeB, which has one MAC entity per cell, for both uplink and downlink. The hybrid-ARQ protocol part is present in both the transmitting and receiving end of the MAC protocol. The MAC (507) offers services to the RLC (505) in the form of logical channels (509).

Physical Layer (PHY, 511), handles coding/decoding, modulation/demodulation, multi-antenna mapping, and other typical physical layer functions. The physical layer (511) offers services to the MAC layer (507) in the form of transport channels (513).

Figure 6:
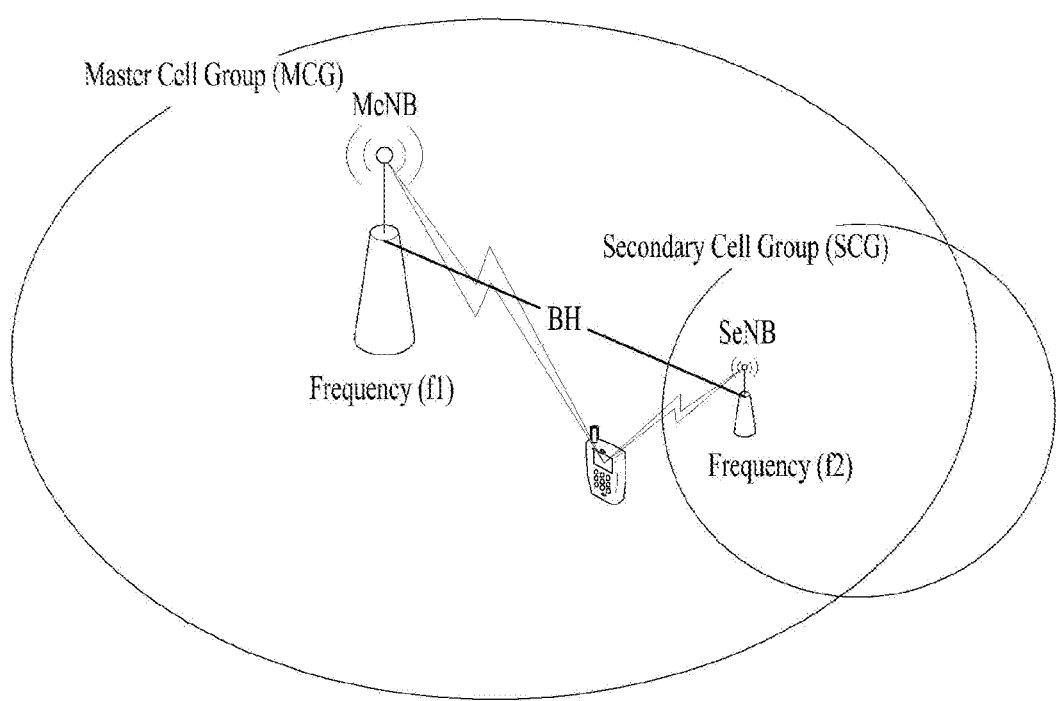
FIG. 6 is a conceptual diagram for dual connectivity between a Master Cell Group (MCG) and a Secondary Cell Group (SCG).

FIG. 6 is a conceptual diagram for dual connectivity between a Master Cell Group (MCG) and a Secondary Cell Group (SCG).

The dual connectivity means that the UE can be connected to both a Master eNode-B (MeNB) and a Secondary eNode-B (SeNB) at the same time. The MCG is a group of serving cells associated with the MeNB, comprising of a PCell and optionally one or more SCells. And the SCG is a group of serving cells associated with the SeNB, comprising of the special SCell and optionally one or more SCells. The MeNB is an eNB which terminates at least S1-MME (S1 for the control plane) and the SeNB is an eNB that is providing additional radio resources for the UE but is not the MeNB.

With dual connectivity, some of the data radio bearers (DRBs) can be offloaded to the SCG to provide high throughput while keeping scheduling radio bearers (SRBs) or other DRBs in the MCG to reduce the handover possibility. The MCG is operated by the MeNB via the frequency of f1, and the SCG is operated by the SeNB via the frequency of f2. The frequency f1 and f2 may be equal. The backhaul interface (BH) between the MeNB and the SeNB is non-ideal (e.g. X2 interface), which means that there is considerable delay in the backhaul and therefore the centralized scheduling in one node is not possible.

In the Dual Connectivity system, the buffer status reporting procedure is used to provide the serving eNB with information about the amount of data available for transmission in the UL buffers associated with the MAC entity. For the buffer status reporting procedure, the MAC entity may consider all radio bearers which are not suspended and may consider radio bearers which are suspended. In this case, buffer status reporting is performed as MAC entity unit. Thus, the each MAC entity operates independently.

If the UE is configured with a Master Cell Group (MCG) and Secondary Cell Group (SCG), the procedures described below are applied to the MCG and SCG, respectively. When the procedures are applied to a SCG, the term primary cell refers to the primary SCell (PSCell) of the SCG.

If the UE is configured with a PUCCH SCell, the procedures are applied to the group of DL cells associated with the primary cell and the group of DL cells associated with the PUCCH SCell, respectively. When the procedures are applied to the group of DL cells associated with the PUCCH SCell, the term primary cell refers to the PUCCH SCell.

A DCI transports downlink, uplink or sidelink scheduling information, requests for aperiodic CQI reports, LAA common information, notifications of MCCH change or uplink power control commands for one cell and one RNTI. The RNTI is implicitly encoded in the CRC. The processing structure for one DCI may include (i) Information element multiplexing, (ii) CRC attachment, (iii) Channel coding, and (iv) Rate matching.

The fields defined in the DCI formats below are mapped to the information bits $\alpha_0$ to $\alpha_{A-1}$ as follows.

Each field is mapped in the order in which it appears in the description, including the zero-padding bit(s), if any, with the first field mapped to the lowest order information bit $a_0$ and each successive field mapped to higher order information bits. The most significant bit of each field is mapped to the lowest order information bit for that field, e.g. the most significant bit of the first field is mapped to $a_0$.

DCI format 0 is used for the scheduling of PUSCH in one UL cell. The following information is transmitted by means of the DCI format 0.

Carrier indicator—0 or 3 bits.

Flag for format0/format1A differentiation—1 bit, where value 0 indicates format 0 and value 1 indicates format 1A.

Frequency hopping flag—1 bit. This field is used as the MSB of the corresponding resource allocation field for resource allocation type 1.

Resource block assignment and hopping resource allocation—$\lceil \log_2(N_{RB}^{UL}(N_{RB}^{UL}+1)/2) \rceil$ bits. For PUSCH hopping (resource allocation type 0 only), $N_{UL\_hop}$ MSB bits are used to obtain the value of $\tilde{n}_{PRB}^{(i)}$ and $(\lceil \log_2(N_{RB}^{UL}(N_{RB}^{UL}+1)/2) \rceil - N_{UL\_hop})$ bits provide the resource allocation of the first slot in the UL subframe. For non-hopping PUSCH with resource allocation type 0, $(\lceil \log_2(N_{RB}^{UL}(N_{RB}^{UL}+1)/2) \rceil)$ bits provide the resource allocation in the UL subframe. For non-hopping PUSCH with resource allocation type 1, the concatenation of the frequency hopping flag field and the resource block assignment and hopping resource allocation field provides the resource allocation field in the UL subframe.

Modulation and coding scheme and redundancy version—5 bits.

New data indicator—1 bit.

TPC command for scheduled PUSCH—2 bits.

Cyclic shift for DM RS and OCC index—3 bits.

UL index—2 bits, this field is present only for TDD operation with uplink-downlink configuration 0.

Downlink Assignment Index (DAI)—2 bits, this field is present only for cases with TDD primary cell and either TDD operation with uplink-downlink configurations 1-6 or FDD operation.

CSI request—1, 2 or 3 bits. The 2-bit field applies to UEs configured with no more than five DL cells and to (i) UEs that are configured with more than one DL cell and when the corresponding DCI format is mapped onto the UE specific search space given by the C-RNTI, (ii) UEs that are configured by higher layers with more than one CSI process and when the corresponding DCI format is mapped onto the UE specific search space given by the C-RNTI, or (iii) UEs that are configured with two CSI measurement sets by higher layers with the parameter csi-MeasSubframeSet, and when the corresponding DCI format is mapped onto the UE specific search space given by the C-RNTI. The 3-bit field applies to UEs that are configured with more than five DL cells and when the corresponding DCI format is mapped onto the UE specific search space given by the C-RNTI. Otherwise, the 1-bit field applies.

SRS request—0 or 1 bit. This field can only be present in DCI formats scheduling PUSCH which are mapped onto the UE specific search space given by the C-RNTI.

Resource allocation type—1 bit. This field is only present if $N_{RB}^{UL} \leq N_{RB}^{DL}$.

If the number of information bits in format 0 mapped onto a given search space is less than the payload size of format 1A for scheduling the same serving cell and mapped onto the same search space (including any padding bits appended to format 1A), zeros shall be appended to format 0 until the payload size equals that of format 1A.

There is one HARQ entity at the MAC entity for each Serving Cell with configured uplink, which maintains a number of parallel HARQ processes allowing transmissions to take place continuously while waiting for the HARQ feedback on the successful or unsuccessful reception of previous transmissions.

At a given TTI, if an uplink grant is indicated for the TTI, the HARQ entity identifies the HARQ processes for which a transmission should take place. It also routes the received HARQ feedback (ACK/NACK information), MCS and resource, relayed by the physical layer, to the appropriate HARQ processes.

For each TTI, the HARQ entity shall identify the HARQ process(es) associated with this TTI, and for each identified HARQ process, the MAC entity shall obtain the MAC PDU to transmit from the Msg3 buffer if there is a MAC PDU in the Msg3 buffer and the uplink grant was received in a Random Access Response, deliver the MAC PDU and the uplink grant and the HARQ information to the identified HARQ process, and instruct the identified HARQ process to trigger a new transmission, if the uplink grant was received on PDCCH.

Each HARQ process is associated with a HARQ buffer.

Each HARQ process shall maintain a state variable CURRENT_TX_NB, which indicates the number of transmissions that have taken place for the MAC PDU currently in the buffer, and a state variable HARQ_FEEDBACK, which indicates the HARQ feedback for the MAC PDU currently in the buffer. When the HARQ process is established, CURRENT_TX_NB shall be initialized to 0.

The sequence of redundancy versions is 0, 2, 3, 1. The variable CURRENT_IRV is an index into the sequence of redundancy versions. This variable is up-dated modulo 4.

New transmissions are performed on the resource and with the MCS indicated on PDCCH or Random Access Response. Adaptive retransmissions are performed on the resource and, if provided, with the MCS indicated on PDCCH. Non-adaptive retransmission is performed on the same resource and with the same MCS as was used for the last made transmission attempt.

The MAC entity is configured with a Maximum number of HARQ transmissions and a Maximum number of Msg3 HARQ transmissions by RRC: maxHARQ-Tx and maxHARQ-Msg3Tx respectively. For transmissions on all HARQ processes and all logical channels except for transmission of a MAC PDU stored in the Msg3 buffer, the maximum number of transmissions shall be set to maxHARQ-Tx. For transmission of a MAC PDU stored in the Msg3 buffer, the maximum number of transmissions shall be set to maxHARQ-Msg3Tx.

When the HARQ feedback is received for this TB, the HARQ process shall set HARQ_FEEDBACK to the received value.

If the HARQ entity requests a new transmission, the HARQ process shall set CURRENT_TX_NB to 0, set CURRENT_IRV to 0, store the MAC PDU in the associated HARQ buffer, store the uplink grant received from the HARQ entity, set HARQ_FEEDBACK to NACK, and generate a transmission as described below.

If the HARQ entity requests a retransmission, the HARQ process shall increment CURRENT_TX_NB by 1. If the HARQ entity requests an adaptive retransmission, the HARQ process shall store the uplink grant received from the HARQ entity, set CURRENT_IRV to the index corresponding to the redundancy version value provided in the HARQ information, set HARQ_FEEDBACK to NACK, and generate a transmission as described below. Else if the HARQ entity requests a non-adaptive retransmission, if HARQ_FEEDBACK=NACK, the HARQ process shall generate a transmission as described below.

To generate a transmission, the HARQ process shall instruct the physical layer to generate a transmission according to the stored uplink grant with the redundancy version corresponding to the CURRENT_IRV value, and increment CURRENT_IRV by 1 if the MAC PDU was obtained from the Msg3 buffer; or if there is no measurement gap at the time of the transmission and, in case of retransmission, the retransmission does not collide with a transmission for a MAC PDU obtained from the Msg3 buffer in this TTI.

If there is a measurement gap at the time of the HARQ feedback reception for this transmission and if the MAC PDU was not obtained from the Msg3 buffer, the HARQ process shall set HARQ_FEEDBACK to ACK at the time of the HARQ feedback reception for this transmission.

After performing above actions, the HARQ process then shall flush the HARQ buffer if CURRENT_TX_NB=maximum number of transmissions—1.

The Logical Channel Prioritization procedure is applied when a new transmission is performed.

RRC controls the scheduling of uplink data by signalling for each logical channel: priority where an increasing priority value indicates a lower priority level, prioritisedBitRate which sets the Prioritized Bit Rate (PBR), bucketSizeDuration which sets the Bucket Size Duration (BSD).

The MAC entity shall maintain a variable Bj for each logical channel j. Bj shall be initialized to zero when the related logical channel is established, and incremented by the product PBR×TTI duration for each TTI, where PBR is Prioritized Bit Rate of logical channel j. However, the value of Bj can never exceed the bucket size and if the value of Bj is larger than the bucket size of logical channel j, it shall be set to the bucket size. The bucket size of a logical channel is equal to PBR×BSD, where PBR and BSD are configured by upper layers.

The MAC entity shall perform the following Logical Channel Prioritization procedure when a new transmission is performed. The MAC entity shall allocate resources to the logical channels in the following steps.

Step 1: All the logical channels with Bj>0 are allocated resources in a decreasing priority order. If the PBR of a logical channel is set to "infinity", the MAC entity shall allocate resources for all the data that is available for transmission on the logical channel before meeting the PBR of the lower priority logical channels.

Step 2: the MAC entity shall decrement Bj by the total size of MAC SDUs served to logical channel j in Step 1.

Step 3: if any resources remain, all the logical channels are served in a strict decreasing priority order (regardless of the value of Bj) until either the data for that logical channel or the UL grant is exhausted, whichever comes first. Logical channels configured with equal priority should be served equally.

The UE shall also follow the rules below during the scheduling procedures above.

The UE should not segment an RLC SDU (or partially transmitted SDU or retransmitted RLC PDU) if the whole SDU (or partially transmitted SDU or retransmitted RLC PDU) fits into the remaining resources of the associated MAC entity.

If the UE segments an RLC SDU from the logical channel, it shall maximize the size of the segment to fill the grant of the associated MAC entity as much as possible.

The UE should maximize the transmission of data.

if the MAC entity is given an UL grant size that is equal to or larger than 4 bytes while having data available for transmission, the MAC entity shall not transmit only padding BSR and/or padding (unless the UL grant size is less than 7 bytes and an AMD PDU segment needs to be transmitted).

The MAC entity shall not transmit data for a logical channel corresponding to a radio bearer that is suspended.

For the Logical Channel Prioritization procedure, the MAC entity shall take into account the following relative priority in decreasing order.

MAC control element for C-RNTI or data from UL-CCCH;
MAC control element for BSR, with exception of BSR included for padding;
MAC control element for PHR, Extended PHR, or Dual Connectivity PHR;
MAC control element for Sidelink BSR, with exception of Sidelink BSR included for padding;
data from any Logical Channel, except data from UL-CCCH;
MAC control element for BSR included for padding;
MAC control element for Sidelink BSR included for padding.

When the MAC entity is requested to transmit multiple MAC PDUs in one TTI, steps 1 to 3 and the associated rules may be applied either to each grant independently or to the sum of the capacities of the grants. Also the order in which the grants are processed is left up to UE implementation. It is up to the UE implementation to decide in which MAC PDU a MAC control element is included when MAC entity is requested to transmit multiple MAC PDUs in one TTI. When the UE is requested to generate MAC PDU(s) in two MAC entities in one TTI, it is up to UE implementation in which order the grants are processed.

In LTE, when the UE wants to transmit data in uplink, the UE request UL grant by transmitting buffer status report to the eNB. Based on the buffer status report from the UE, the eNB may allocate UL grant to the UE via PDCCH signaling. The PDCCH includes various DCI using various formats. For example, the DCI format 0 may be used to allocate an UL grant to the UE.

The problem in the prior art is that an UL grant is allocated for all RBs of a UE, and it cannot be guaranteed that the UE uses the received UL grant for a specific RB. For fine control of RB scheduling, a mechanism to use UL grant only for a specific logical channel group (LCG) needs to be considered. The Logical Channel Group (LCG) is a group of logical channels whose data available for transmission are reported in BSR as a one group.

Figure 7:
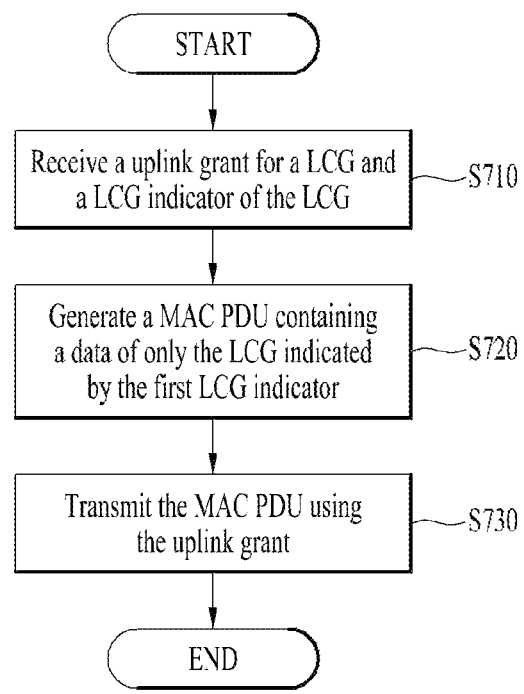
FIG. 7 is a diagram for transmitting data according to an embodiment of the present invention.

FIG. 7 is a diagram for transmitting data according to an embodiment of the present invention.

Referring to FIG. 7, the UE may receive a uplink grant for logical channel group (LCG) and a LCG indicator of the LCG (S710). In order for UE to use UL grant for a specific LCG, the eNB may indicate which LCG of the UE shall use the UL grant when the eNB allocates an UL grant to a UE.

For the signaling of UL grant and LCG indicator, the UE may receive UL grant and LCG indicator as shown in the following examples.

As an example, the uplink grant and the LCG indicator are received through a Downlink Control Information (DCI) included in a Physical Downlink Control Channel (PDCCH). For example, in the prior art, UL grant may be included in the DCI format 0 (i.e. resource block assignment and hopping resource allocation). However, in this example, the LCG indicator may also be included in the DCI format 0. The length of the LCG indicator field should be able to indicate the maximum number of LCGs that one UE supports. In LTE, the maximum number of LCGs is 4, and the LCG indication field should be 2 bits in this case.

For example, the DCI further includes uplink grant for another radio bearer and a radio bearer indicator of another radio bearer. In other word, multiple sets of UL grant and LCG indicator may be included in the DCI of the PDCCH to allocate multiple UL grants via one PDCCH signaling. For this, The DCI may be extended to include multiple sets. In this case, when the UE receives at least one set of UL grant and LCG indicator, the UE may generate multiple PDUs for each LCG, and transmits them using the respective UL grants.

As the number of available bits in PDCCH is limited, multiple sets of UL grant and LCG indicator may not be included in one PDCCH. As another example for solving this problem, the uplink grant and the LCG indicator may be received through a downlink MAC PDU included in a Physical Downlink Shared Channel (PDSCH).

In this case, the UE may receive a DCI indicating the PDSCH through a Physical Downlink Control Channel (PDCCH). The PDCCH indicates PDSCH and the downlink MAC PDU transmitted on the PDSCH may include one or more UL grants and LCG indicators. For example, DCI formats 1, 2, 3, 4, 5, 6 may be used for indicating the PDSCH. In addition, a special indication may be added in those DCI formats to indicate that the corresponding PDSCH includes UL grant and LCG indicator. For another example, a new DCI format may be used to indicate PDSCH including UL grant and LCG indicator.

In addition, the uplink grant and the LCG indicator may be included in the downlink MAC PDU as a MAC control element (CE). For example, an LCID may be allocated for the UL grant MAC CE and one UL grant MAC CE may include one set of UL grant and LCG indicator. For another example, one UL grant MAC CE may include multiple sets of UL grant and LCG indicator.

When the UE receives an UL grant and LCG indicator, the UE may generate a Medium Access Control Protocol Data Unit (MAC PDU) containing a data of only the LCG indicated by the LCG indicator (S720). Subsequently, the UE may transmit the MAC PDU using the uplink grant (S730).

Figure 8:
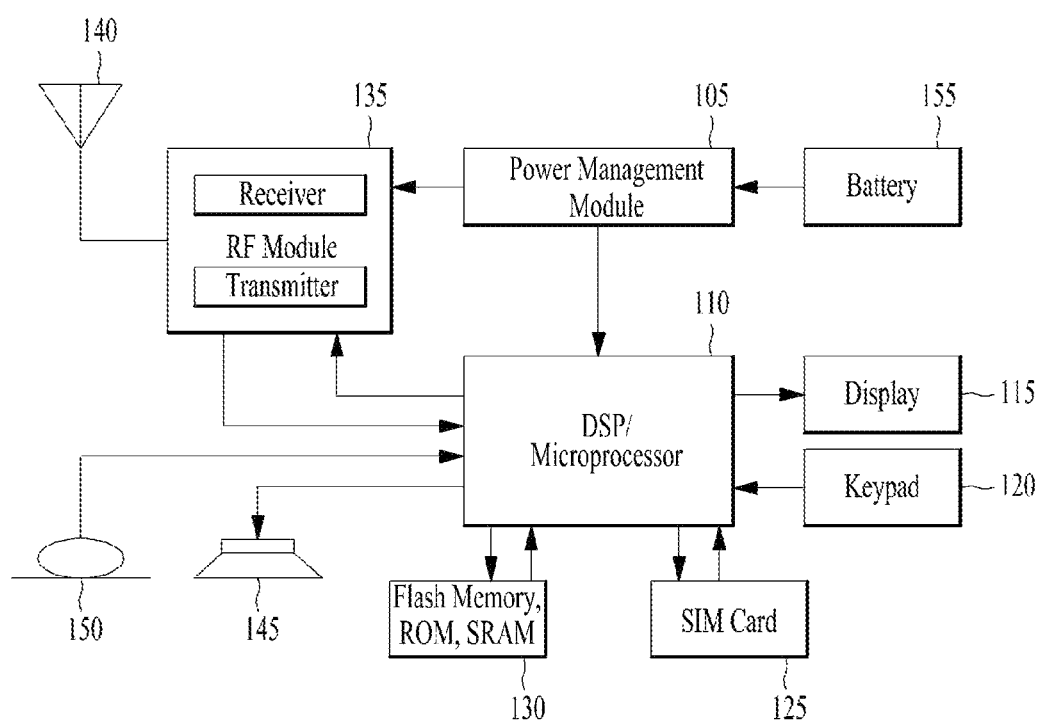
FIG. 8 is a block diagram of a communication apparatus according to an embodiment of the present invention

FIG. 8 is a block diagram of a communication apparatus according to an embodiment of the present invention.

The apparatus shown in FIG. 8 can be a user equipment (UE) and/or eNB adapted to perform the above mechanism, but it can be any apparatus for performing the same operation.

As shown in FIG. 8, the apparatus may comprise a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 8 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 8 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. The processor (110) is configured to perform operations according to the embodiment of the present invention exemplarily described with reference to the accompanying drawings. In particular, the detailed operations of the processor (110) can refer to the contents described with reference to FIGS. 1 to 7.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

What is claimed is:

1. A method for transmitting, by a user equipment (UE), data in a wireless communication system, the method comprising:
   receiving a first uplink grant for a logical channel group (LCG) and a first LCG indicator of the LCG,
   wherein the LCG is included in a plurality of LCGs having available data for transmission;
   generating a Medium Access Control Protocol Data Unit (MAC PDU) containing only data of the LCG indicated by the first LCG indicator;
   performing a logical channel prioritization procedure based on the data of the LCG contained in the MAC PDU; and
   transmitting the MAC PDU using the first uplink grant,
   wherein the first uplink grant and the first LCG indicator are received through a Downlink Control Information (DCI) included in a Physical Downlink Control Channel (PDCCH), and
   wherein the DCI further includes a second uplink grant for another LCG and a second LCG indicator of the another LCG.

2. A user equipment (UE) in a wireless communication system, the UE comprising:

a transmitter and a receiver; and a processor, operatively coupled to the transmitter and the receiver, wherein the processor is configured to:

control the receiver to receive a first uplink grant for a logical channel group (LCG) and a first LCG indicator of the LCG, wherein the LCG is included in a plurality of LCGs having available data for transmission;

generate a Medium Access Control Protocol Data Unit (MAC PDU) containing only data of the LCG indicated by the first LCG indicator, perform a logical channel prioritization procedure based on the data of the LCG contained in the MAC PDU, and control the transmitter to transmit the MAC PDU using the first uplink grant, wherein the first uplink grant and the first LCG indicator are received through a downlink MAC PDU included in a Physical Downlink Shared Channel (PDSCH).

3. A user equipment (UE) in a wireless communication system, the UE comprising:

a transmitter and a receiver; and a processor, operatively coupled to the transmitter and the receiver, wherein the processor is configured to:

control the receiver to receive a first uplink grant for a logical channel group (LCG) and a first LCG indicator of the LCG, wherein the LCG is included in a plurality of LCGs having available data for transmission, generate a Medium Access Control Protocol Data Unit (MAC PDU) containing only data of the LCG indicated by the first LCG indicator, perform a logical channel prioritization procedure based on the data of the LCG contained in the MAC PDU, and control the transmitter to transmit the MAC PDU using the first uplink grant, wherein the first uplink grant and the first LCG indicator are received through a downlink MAC PDU included in a Physical Downlink Shared Channel (PDSCH), and wherein the first uplink grant and the first LCG indicator are included in the downlink MAC PDU as a MAC control element (CE).

4. A method for transmitting, by a user equipment (UE), data in a wireless communication system, the method comprising:

receiving a first uplink grant for a logical channel group (LCG) and a first LCG indicator of the LCG, wherein the LCG is included in a plurality of LCGs having available data for transmission;

generating a Medium Access Control Protocol Data Unit (MAC PDU) containing only data of the LCG indicated by the first LCG indicator;

performing a logical channel prioritization procedure based on the data of the LCG contained in the MAC PDU; and transmitting the MAC PDU using the first uplink grant, wherein the first uplink grant and the first LCG indicator are received through a downlink MAC PDU included in a Physical Downlink Shared Channel (PDSCH).

* * * * *